April 28, 1970   B. N. DERICK ET AL   3,508,589
LUMINOUS TEXTILE PRODUCTS
Filed Oct. 27, 1967   4 Sheets-Sheet 1
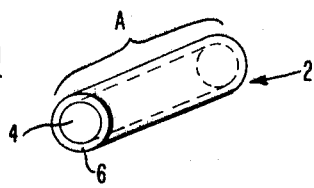
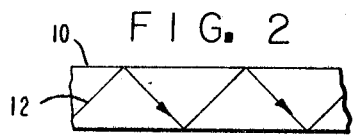 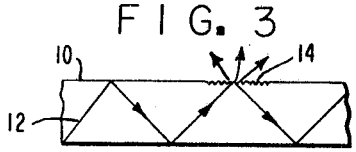
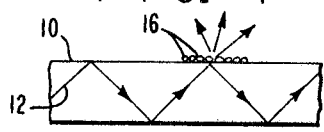 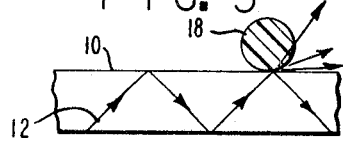
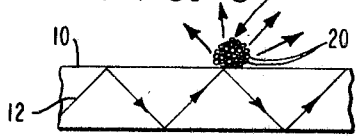 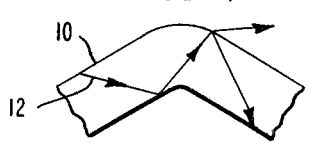
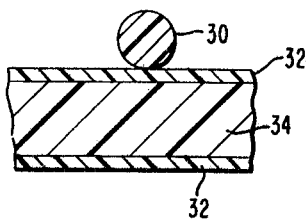 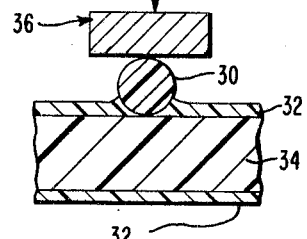
INVENTORS
BURTON N. DERICK
SAYLOR C. SNYDER, JR.
BY   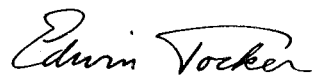
ATTORNEY April 28, 1970   B. N. DERICK ET AL   3,508,589
LUMINOUS TEXTILE PRODUCTS
Filed Oct. 27, 1967   4 Sheets-Sheet 2

INVENTORS
BURTON N. DERICK
SAYLOR C. SNYDER, JR.

BY *Edwin Locker*

ATTORNEY

April 28, 1970  B. N. DERICK ET AL  3,508,589
LUMINOUS TEXTILE PRODUCTS
Filed Oct. 27, 1967  4 Sheets-Sheet 3

40  41

INVENTORS
BURTON N. DERICK
SAYLOR C. SNYDER, JR.

BY Edwin Tocker

ATTORNEY

April 28, 1970   B. N. DERICK ET AL   3,508,589
LUMINOUS TEXTILE PRODUCTS
Filed Oct. 27, 1967   4 Sheets-Sheet 4

INVENTORS
BURTON N. DERICK
SAYLOR C. SNYDER, JR.

BY  *Edwin Vocker*
ATTORNEY

United States Patent Office 3,508,589
Patented Apr. 28, 1970

3,508,589
LUMINOUS TEXTILE PRODUCTS
Burton N. Derick and Saylor C. Snyder, Jr., Wilmington, Del., assignors to E. I. du Pont de Nemours and Company, Wilmington, Del., a corporation of Delaware
Filed Oct. 27, 1967, Ser. No. 678,725
Int. Cl. D03d 15/00
U.S. Cl. 139—420        12 Claims

ABSTRACT OF THE DISCLOSURE

Upon integrating optical filamentary material into a textile product and frustrating the total reflection mechanism or "light piping" effect of the light transmitting portion of the optical filamentary material, either before or after the integration, illumination of its ends illuminates the textile product in the area(s) where the frustration is effected. By having optical filamentary material terminate within the textile product, illumination of the textile product at the ends within the product occurs.

---

This invenion relates to textile products such as fabrics, yarns and ropes, and more particularly, to products which are made luminous through the incorporation of optical filamentary material therein.

Optical filamentary material, also called by such names as light transmitting filaments or fiber optics, is becoming increasingly prominent in commerce because of its ability to transmit light or images along a flexible axis. Such material which is capable of such transmission over long distances is described in British Patent 1,037,498 to Du Pont. The light is transmitted along the length of the light transmitting portion of the optical filamentary material by multiple internal reflections of the light therein. Throughout the development of optical filamentary material great care has been taken to minimize the light losses along the length of the optical filamentary material, or in other words to make the internal reflections as total as possible, so that the light applied to one end of the optical filamentary material is efficiently made available at the opposite end of the material. Such efforts have included sheathing the light transmitting portion of the optical filamentary material with solid materials of lower index of refraction which act as optical insulation, minimizing the escape of light along the length of the filaments. Generally, such sheathing has been of a transparent nature since opaque sheaths tend to absorb light and thereby decrease the efficiency of light transmission.

One aspect of the present invention involves the use of optical filamentary material wherein the escape of transmitted light along the length of the optical filamentary material is desirable. More particularly, it has been found that when the optical filamentary material is incorporated, made into, or otherwise integrated into a textile product, the textile product can be made luminous in any one or more selected areas of any desired design by frustrating the total internal reflection character of the optical filamentary material present in such areas. Illumination in these selected areas is caused by light from a remote source incident on the ends of the optical filamentary material, with this light emerging from the optical filamentary material in the selected areas rather than being transmitted end-to-end of the optical filamentary material. Whereas in fiber optic technology this emergence was heretofore considered light loss and undesirable, the luminous textile products of this invention are highly desirable. For example, the textile product can be in the form of a fabric providing functional or decorative illumination.

In one embodiment of this aspect of the invention, frustration of the total internal reflection character or "frustrated total reflection" is obtained by disrupting the surface of the light transmitting portion of the optical filamentary material. In another embodiment, frustrated total reflection is obtained by bringing one or more refraction producing solids into contact with the light transmitting portion. By varying the intimacy of this contact, the illumination of the textile product varies, providing pressure-sensitivity.

Another aspect of the present invention also involves integration of optical filamentary material into a textile product, but retaining the end-to-end light transmitting character of the material. In this aspect, however, the optical filamentary material terminates between the extremities of the textile product so as to be within the textile product, with the terminating ends of the material providing point source illumination. Illumination achieved in this fashion imparts a sparkle effect to the textile product, particularly when it is in the form of a fabric. This manner of providing a luminous textile product can be used in combination with the manner employing frustrated total reflection.

These and other embodiments of the present invention will be more fully described hereinafter in connection with the drawings, in which:

FIG. 1 is a perspective view of a short length of optical filamentary material;

FIG. 2 depicts in side elevation a length of an air sheathed optical filamentary material showing the path of a light ray therethrough;

FIG. 3 depicts the unsheathed optical filamentary material of FIG. 2 showing the refractive effect of disruption of a portion of its surface;

FIGS. 4, 5 and 6 depict the unsheathed optical filamentary material of FIG. 2 showing the refractive effect obtained by contact with refractive producing solids.

FIG. 7 depicts the frustration of total reflection caused by excessive bending of the optical filamentary material of FIG. 2;

FIGS. 8 and 9 depict a length of sheathed optical filamentary material in longitudinal cross-section showing one embodiment of steps for achieving contact between the core filament and a refraction producing solid;

DESCRIPTION OF OPTICAL FILAMENTARY MATERIAL

Figure 10:
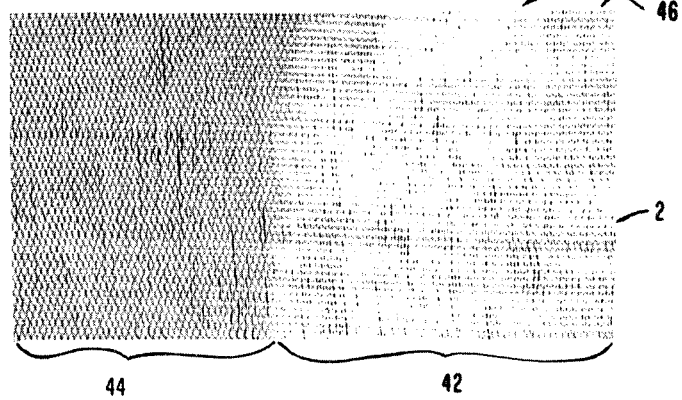
FIG. 10 is a photograph enlarged 2× of a portion of a fabric incorporating optical filamentary material and illustrating the luminous effect obtainable thereby.

The present invention is applicable to optical filamentary material in general. This material consists of one light transmitting continuous filament or a plurality of such filaments travelling or bundled together, the material being in either case flexible along its length so as to be suitable for handling by textile yarn or fabric forming machines and to yield a flexible textile product; generally, for this suitability, the material in either single filament or bundle form will have a maximum diameter of about 0.080 inch.

The optical filamentary material can include a solid sheath for each filament or can be unsheathed. Generally, however, when more than one continuous filament is present, i.e., the material is in the form of a bundle, each filament is sheathed. When unsheathed, air or other fluid of lower index of refraction than the light transmitting portion of the material serves as the sheathing in the sense that the internal reflection mechanism by which the light transmitting portion "pipes" light from end-to-end is retained. The unsheathed material, however, is prone to unplanned frustrated total reflection caused by such means as disruption of its surface or contact with refraction producing solids, which would be disadvantageous to the planned luminous effects obtained by the present invention. Thus, for protective purposes, optical filamentary material which incldues solid sheathing over its light transmitting portion is preferred for use in the present invention, it being understood, of course, that such sheathing is removed, at least where illumination by the textile product incorporating the optical filamentary material is desired.

Typically, as shown in FIG. 1, the optical filamentary material 2 comprises a light transmitting portion or core filament 4 coated with a solid sheath material 6 along its length to prevent the escape of light along its length (lengh A). The core filament is of clear or optical transparent (low absorbance of visible light) material and can be made of either plastic or glass having such optical character. Representative core materials include styrene polymer, including the homopolymer and copolymer with other copolymerizable monomers in minor proportion; acrylate polymer, including methyl methacrylate homopolymer and copolymers with other copolymerizable monomers in minor proportion; and barium, flint and borosilicate crown glasses; the more dense the glass the better. Further details of desirable core materials are given in British Patent No. 1,037,498.

The sheath material should be tough, to provide protection to the core filament, and as optically transparent as possible. Representative sheath materials include the same materials hereinabove described as useful for core materials, and in addition, the fluoroalkyl-methacrylate sheathing described in British Patent No. 1,037,498. The particular sheath material used will depend on the particular core material used, satisfying such criteria as fabricability and ability to obtain total reflection at the sheath-core interface. The latter criteria is generally met when the index of refraction of the sheath material is at least three percent less than the refractive index of the core material; the greater the difference between refractive indices of the sheath and core materials the better. Representative combinations include methyl methacrylate polymer core and fluoro-alkyl methacrylate polymer sheath; styrene polymer core and methyl methacrylate polymer sheath; high density glass core and low density glass sheath (such as described in U.S. Patent No. 3,148,967). Generally, the core will have a diameter of at least 0.05 mil, and the solid sheath thickness (when sheathing is used) will be at least three times the wavelength of light. The light, which is internally reflected by and along the core filament generally penetrates the sheath to the extent of several wavelengths of light and for this reason such thickness of sheathing is considered herein as part of the light transmitting portion of the optical filamentary material. A sheathing of opaque material, e.g., polyethylene containing carbon black as an opacifier, can be used for cladding the optically transparent sheathing hereinbefore described to better insure against unplanned light leakage.

The total internal reflection character, which is a well-known phenomenon, of a typical optical core-filament 10 is shown in FIG. 2 by the zig-zag path of a light ray 12 emanating from a remote light source (not shown), from one side of the filament to the opposite side. Normally, this light ray would be visible as illumination at the end of the filament remote from the light source. This normal usage is employed in the one aspect of the invention wherein the filament terminates within the textile product.

In accordance with another aspect of the present invention, this total reflection character of the filament 10 is modified by frustration at at least one selected location. Then, instead of light traveling entirely end-to-end of the core filament, at least a portion of the light emerges at each selected location. Generally, any method for obtaining this light emergence is suitable for use in the present invention. However, for different applications of the different compositions of the optical filamentary material, some methods may be better than others. Exemplary of methods of frustrating total reflection are disrupting the internal reflecting surface of the core filament, or bringing it into contact with at least one refraction producing solid, or changing the geometry of the core filament so that the light ray no longer internally reflects, or any combination of these methods.

Disruption of the internal reflecting surfaces can be accomplished by forming a roughened area 14 in the surface of the core filament 10, as shown in FIG. 3, such as by etching, grit blasting or abrading the surface. Instead of the entire light ray 12 being internally reflected, a portion of it emerges as scattered light represented by the trio of divergent arrows in FIG. 3.

Refraction producing solids can be any solid which upon contact with the core filament causes some of the light to leave the core filament instead of being totally internally reflected therein. To accomplish this, the solid has a higher index of refraction than the core filament. Preferably, the solid is one through which the emerging light is visible. Discrete, closely spaced opaque solids, however, are useful, with the emerging light being visible as scattered reflections from one another. FIG. 4 shows the scattering of light ray 12 on incidence upon refraction producing particulate solids 16 contacting the core filament 10. In FIG. 5, a portion of the light ray 12 refracts through the transparent object 18 of annular cross-section contacting the core-filament 10 and provides some scattering adjacent the object-filament interface. The same refractive effect, only accompanied by more scattering, is obtained by the annular assemblage 22 of transparent objects 20 of annular cross-section shown in FIG. 6.

Exemplary of objects 16 are dust and dust-like solids and frost coatings. Exemplary of object 18 are glass and plastic beads, spheres and the like, and also mono-filamentary material. The assemblage 22 can be a yarn-like textile product, with the objects 20 being filaments and/or fibers of such translucent to transparent refraction producing plastic materials as polyolefins, e.g., polyethylene and polyproplene and copolymers thereof with each other with minor proportions of other ethylenically unsaturated copolymerizable monomers; polyamides, polyesters, polyacrylonitriles, silk and rayons.

Changing the geometry of the core-filament, such as by bending it, as shown in FIG. 7, results in light emerging from the surface where the angle of bend approximately exceeds the angle of internal reflection. Another geometric change would be to form or otherwise cause axial fluctuations to be present in the diameter of the core filament.

The degree to which total deflection by the core filament is frustrated, by the hereinbefore described or other methods, will depend on the frequency or distribution of light emergence points desired. The degree of frustration at any one point along the core filament should not be so great as to use up light required for transmission to other such points, otherwise such other points will remain unilluminated. In other words, while frustration of total reflection at selected points is desired according to the present invention, maintainence of some total reflection and thereby some of the end-to-end transmission character of the core filament is also generally desired to insure illumination at all points of frustrated total reflection. However, this maintaining becomes less important when a light source is used to illuminate both ends of the core filament, in which case the light traveling in one direction through the filament is complemented by light traveling in the opposite direction.

While the methods of achieving frustrated total reflection of the core filament depicted in FIGS. 3 to 7 make reference to an unsheathed core filament 10, such methods and others are equally applicable to sheathed core filaments, it being only necessary to first remove the sheath at least where frustated total reflection is desired. The methods of achieving the roughened area 14 (FIG. 3) can be used for this purpose and continued on into the core filament or replaced by other methods of achieving frustrated total reflection once the sheath is removed. In the case of plastic sheath-core filaments, solvents which dissolve the sheath and not the core filament can be used for sheath removal. For example, acetic acid can preferentially dissolve polymethylmethacrylate (as a sheath) and not polystyrene (as a core). Another method, when the sheath is thermoplastic, is to heat the sheath sufficiently so that it is deformable, and deform the heated sheath to expose the core filament. One method of accomplishing this is to position a monofilament 30 of higher melting temperature than the sheath against the thermoplastic sheath 32 of core filament 34, as shown in FIG. 8, and thereafter apply radiant heat and pressure, such as by heating iron 36 shown in FIG. 9, to force the monofilament through the sheath 32 and into contact with the core filament. This method can generally be applied with the objects 16, 18 and 20 discussed hereinbefore. The same and similar methods can be employed to selectively remove any outer cladding, such as the opaque sheathing hereinbefore described, that may be present.

TEXTILE PRODUCTS

Textile products refers to products produced by textile operations or processes such as weaving or twisting as distinguished from single filaments or bundles thereof of optical filamentary material. Thus, textile products as used herein includes yarn-like products, i.e., one or more continuous strands fibers and/or filaments twisted together, such yarn-like products including yarn, single and plied, thread, cord, braid, and rope. Textile products also includes fabrics, i.e., structures produced by the interlacing of yarns, fibers, or filaments. Textile products further includes non-woven fabrics.

The manner of integrating the optical filamentary material into a textile product will depend on the particular product. Conventional textile equipment and processes are generally applicable. Thus, the optical filamentary material can be twisted with itself and/or other filamentary or fibrous (staple) material into yarn, and the yarn can be made into other textile products, such as thread, rope and fabrics. The optical filamentary material can also be made into fabrics with itself and/or other filamentary or yarn-like material by conventional weaving or non-woven techniques. The other filamentary material, e.g., filaments, fibers, or yarns, which come into contact with the optical filamentary material in these textile products can serve as refraction producing solids, although not necessarily so if other methods of producing frustrated total reflection are employed, in which case some or all of the other filamentary material can be of non-refraction producing character. The optical filamentary material need not necessarily be integrated into the textile product while the product is being made, but can be integrated therein after the product is made. For example, the optical filamentary material can be incorporated into fabrics by sewing.

The optical filamentary material can be modified to exhibit frustrated total reflection either before or after in'egration into a textile product, depending on the particular product and upon the particular luminous effect desired. The optical filamentary material can also be integrated into a textile product in a manner in which ends of the optical filamentary material lie within the product so as to give a sparkle-type lumination. In one embodiment to achieve this effect, the optical filamentary material is severed at selected locations within the textile product after incorporation therein.

Figure 11:
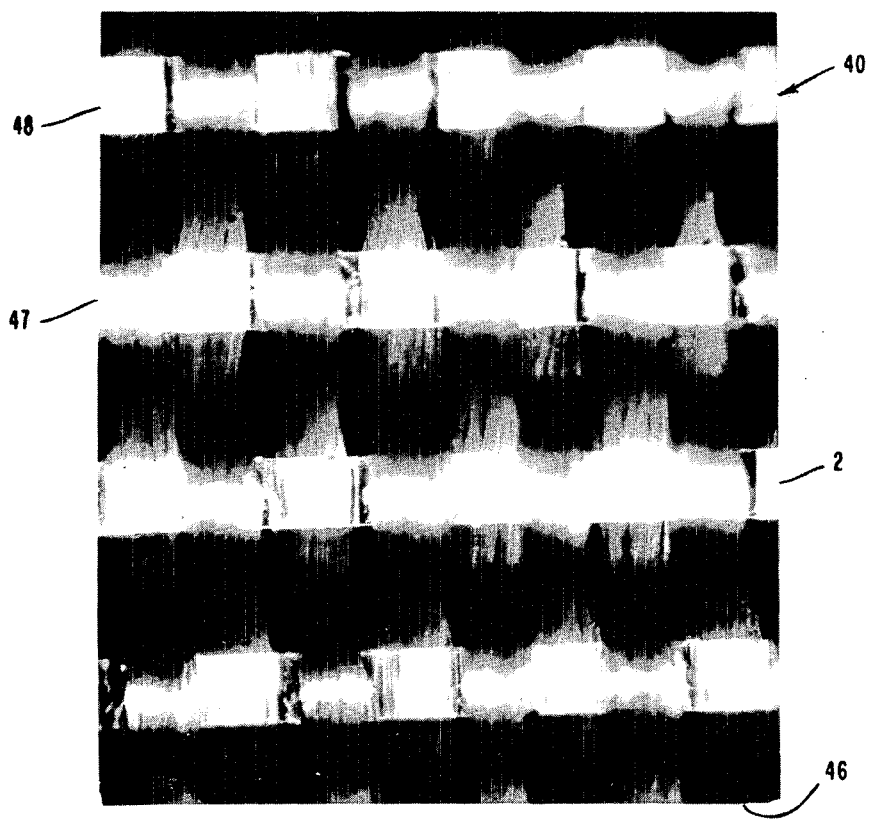
FIG. 11 is a photograph enlarged about 50× of a portion of the fabric of FIG. 10.

FIG. 10 is a photograph, enlarged about 2 times, of one embodiment of textile product of this invention, namely a fabric 40, illustrating one embodiment of illumination effect obtainable therewith. The fabric 40 exhibits a luminous area 42 and a darkened area 44. FIG. 11 is an enlargement (about 50 times) of a portion of the luminous area 42, wherein it can be seen that the fabric is a 1:1 plain weave, which is the weave throughout. Single filaments of optical filamentary material 2 forms the fill direction of the weave and polyester (polyethylene terephthalate) yarn 46 forms the machine direction.

In FIG. 11, the illumination appears as occurring from discrete locations, namely narrow light bands 47, alternating with broader light bands 48. These light bands occur where the yarn crosses over and under the optical filamenary material to contact the light transmitting portion of optical filamentary material at these crossovers in a manner represented by FIG. 6. The narrow bands 47 result from viewing the emitted light through the yarn 46, with this light being scattered by the individual fibers of the yarn. The broader bands 48 result from viewing the same scattered light but through the cylindrical lens formed by the optical filamentary material. These bands 47 and 48, when viewed in actual size provide a fairly uniform illumination of the entire area (see e.g., area 42 of FIG. 10).

Illumination of the fabric 40 is limited to the area 42 by confiining the frustrated total reflection character of the optical filamentary material to this area. For fabric 46, this confinement is obtained by removing the sheathing from the optical filamentary material lying in area 42 in the manner described in Example 2 hereinafter. The optical filamentary material in the non-luminous or darkened area 44 retains its sheathing and thereby its normal end-to-end or total internal reflection character, transmitting light from a remote light source (not shown) to area 42.

The uniformity of illumination of fabrics of this invention can be varied such as by the tightness of the weave and/or by the proportion of optical filamentary material versus other material present in the fabric. The illumination by area 42 of fabric 40 can be made more uniform, for example, by using a tighter weave and/or by using optical filamentary material in the machine direction as well.

Through the principle of confirming the frustrated total reflection character of the optical filamentary material to any one or more selected areas, each of any design desired, of the fabric, variations in the overall luminous effect are limitless. For example, the entire fabric or any selected part thereof can be made luminous. The illumination can be in the form of printing or other design, such as pictures, writing, and other forms for decorative or advertising purposes, or can form the background for non-luminous areas in the form of printing or such other design. The method used for confining frustrated total reflection to selected areas will depend on the particular method of achieving the frustration. For example, stencils are useful for confining grit blasting; masking is useful for chemical etching and solvent treatment. In the hot ironing technique, the iron can be in the form of a printing plate, with the raised portion of the plate serving to frustrate the total reflection of the optical filamentary material in the design of the raised portion.

Fabrics of this invention are useful in many of the same ways as conventional fabrics, with the luminous ability thereof supplying novel decorative and utilitarian effects. For example, the optical filamentary material may be colored or have a colored sheath, or such material of several colors may be incorporated into a single fabric whereby upon illumination from a single light source, different color effects appear in the fabric. Similarly, moving the light source with respect to the fabric or changing the color of the light source, e.g., with a color wheel, produces novel shadow and color effects. Color, if present, in the transparent yarn integrated with the fiber optics shows up in the pastel shade. These effects are particularly useful and attractive for advertising displays.

The fabrics of this invention, particularly those having an area of substantially uniform illumination, are also useful for general illumination, such as in the manner of electroluminescent panels. Such fabrics, however, provide the advantage that the electrical apparatus required to activate electroluminescent panels from a D.C. source are not needed in the present invention. In addition, the hard or stiff form of such panels is absent for the soft and flexible fabrics of the present invention.

Figure 13:
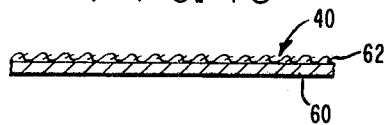
FIG. 13 shows schematically and in side elevation a laminate in which one layer is a fabric incorporating features of the present invention.

Stiff panels of fabrics of the present invention can be made, however, such as by impregnating with or encapsulating the fabric in a transparent or translucent plastic material of lower refraction (than the core filaments), such as the low index thermosetting resin, e.g., epoxy resin, which subsequently harden. In such embodiment, the light emitted through refraction producing solids will continue to be emitted through the plastic impregnant. In another embodiment, the fabric 40, either by itself or impregnated or encapsulated as just described, can be laminated by conventional methods (such as by using epoxy resin adhesive) to a solid base 60 to form the composite structure in FIG. 13. In still a further embodiment, the surface 62 facing the fabric 40 can be a reflective surface, so as to reflect the illumination from the interior or facedown side of the fabric to the exterior side thereof.

Figure 14:
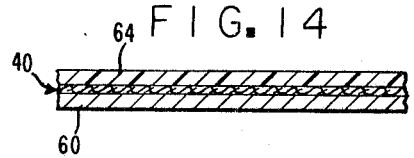
FIG. 14 shows schematically and in side elevation another embodiment of laminate incorporating a fabric of the present invention.

In another embodiment, as shown in FIG. 14, a sheet 64 of translucent material is laminated to the exterior face of fabric 40 to provide a further scattering of the illumination from the fabric. Exemplary of translucent materials include opal glass and sheeting of highly crystalline plastics, such as linear polyethylene and polypropylene.

The fabrics of this invention are not limited to any particular form of interlaced structure, except that the disposition of the optical filamentary material therein should not be such that frustrated total reflection occurs, unplanned, by geometric disposition. This precaution also applies to the integration of optical filamentary material into non-woven fabrics, which can be treated as hereinbefore described to get the luminous effect desired.

Figure 12:
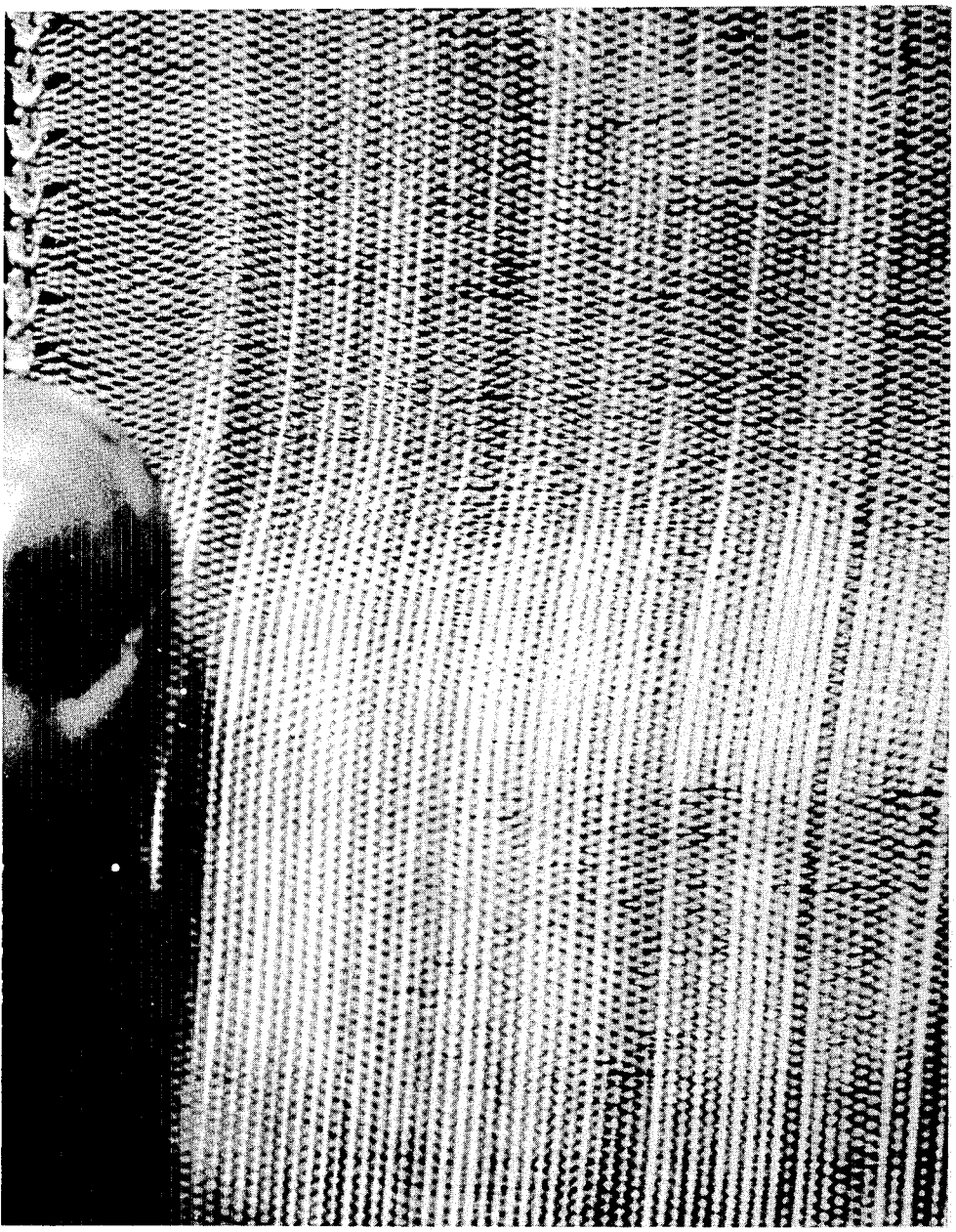
FIG. 12 shows a photograph enlarged about 5× of a portion of the fabric of FIG. 10 with localized increased illumination illustrating the pressure sensitivity thereof.

In fabrics such as fabric 40, wherein the optical filamentary material and yarn are movable relative to each other at their cross-overs, the scattering effect of the yarn on the light emitted by the optical filamentary material can be enhanced and the illumination thereby increased by increasing the intimacy of contact between the yarn 46 and the optical filamentary material 2. This can be accomplished by the tightness of the weave of the fabric and/or exerting a force on the fabric which forces the yarn and the optical filamentary material against one another at their cross-overs. One method for accomplishing this is to apply pressure to one or both surfaces of the fabric in the luminous area, with the increased illumination being visible in the area of pressure application. Another method of accomplishing this is by stretching the fabric with the increased illumination appearing in the area of stretch. This embodiment is illustrated by FIG. 12, wherein fabric 40 is manually stretched in the direction of arrows 41, with the horizontally extending area between the fingers (only one is shown) being brighter than the luminous area therebelow. In another embodiment of this invention, the fabric does not become visibly luminous until stretching or pressure forces are exerted on the fabric to increase the intimacy of contact between the optical filamentary material and the yarn. This embodiment is achieved, for example, by a loose weave of optical filamentary material and yarn, such as yarn 46.

This pressure-responsive effect enables fabrics of this invention to be used in pressure-sensing applications, whether the pressure be resulting from force applied to a surface of the fabric or tensile forces applied in the plane of the fabric, with the increase, including the inception of, luminousness of the fabric being the indicator of the existence of such pressure. The variable illumination feature of the fabrics of the present invention makes them readily useful and attractive for advertising display purposes.

Figure 15:
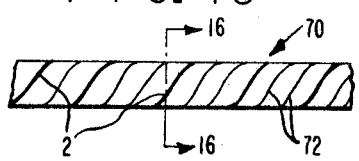
FIG. 15 shows a length of yarn incorporating optical filamentary material.
Figure 16:
FIG. 16 is a cross-section taken along line 16—16 of FIG. 15.
Figure 17:
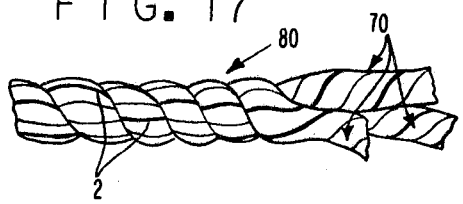
FIG. 17 shows a length of another textile product incorporating optical filamentary material.

Luminous yarn-like textile products can be made by integrating optical filamentary materials with textile filamentary material, including optical filamentary material, such as by a twisting operation. For example, as shown in FIG. 15, a strand of yarn 70 consists of optical filamentary material 2 (shown in heavy line for clarity) twisted together with polyamide textile filaments 72. The optical filamentary material can be present in the interior of the yarn as shown in FIG. 16. The methods of achieving selective frustrated reflection in fabrics, as hereinbefore discussed, are generally applicable to yarn-like textile products. For example, when the other textile materials associated with the optical filamentary material in yarn 70 are refraction producing and in contact with the light transmitting portion, light is emitted along the length of the yarn, illuminating the yarn at the point(s) of light emission. Such yarn is useful for making into fabrics, e.g., yarn 70 can be used in place of optical filamentary material 2 in fabric 40. Another application is to twist together a plurality of strands of yarn to form a thread 80, e.g., consisting of three strands of yarn 70 of FIG. 15, as shown in FIG. 17. The resultant thread can be sewn into fabrics already made, and a luminous design achieved along the length of the sewn-in thread. When the other textile materials associated with the optical filamentary material (to make yarn) is of heavy denier, the resultant product, resembling thread 80, will be useful as rope. Such threads and ropes are generally useful in place of the so-called reflective threads and ropes disclosed in such U.S. patents as U.S. Patent No. 3,050,824, U.S. Patent No. 2,382,355, and U.S. Patent No. 2,937,668.

Figure 19:
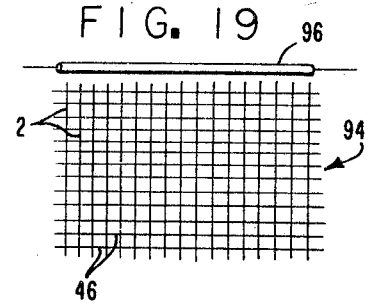
FIG. 19 shows a fabric incorporating features of the present invention and another method for illumination thereof.
Figure 18:
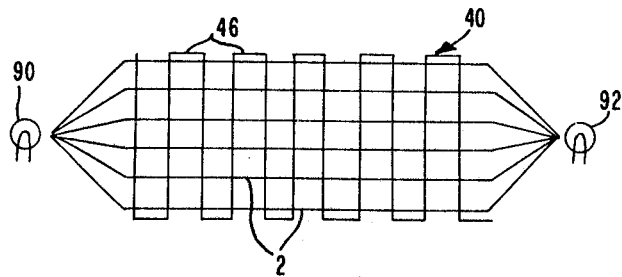
FIG. 18 shows schematically and in plan view a fabric incorporating features of the present invention and one method of causing the illumination thereof.

The principle of applying light to optical filamentary material to obtain illumination remote from the point of light application is applicable to illuminating textile products according to the present invention. Sufficient of the ends of the optical filamentary material, whether the material is part of a fabric, yarn, thread or rope, must be exposed to the light to obtain the illumination desired. In one method of accomplishing this, as shown in FIG. 18, the fabric 40 is formed of optical filamentary material 2 interwoven with yarn 46, with the ends of the optical filamentary material 2 extending beyond a pair of opposite sides or edges of the fabric and converging together for exposure to light sources 90 and 92. The optical filamentary materials are sheathed or otherwise protected from light leakage until they reach the areas in the fabric where luminence is desired. For long lengths of fabric, the use of light sources, e.g., 90 and 92, at each end is desirable. Instead of exposing both ends of each filament 2 to light sources 90 and 92, light source 90 can be applied to every other filament 2, with light source 92 being applied to the remaining filaments 2. For short lengths of fabric, a single light source is generally sufficient. An example of such an arrangement is shown in FIG. 19, wherein a fabric 94 consists of optical filamentary material 2 interwoven with yarn 46 with the filaments 2 terminating at an edge of the fabric which runs along the length of a neon lamp 96 to receive the illumination therefrom and transmit it to the illumination area of the fabric. These methods of lighting and others are applicable to other textile products of the present invention, such as yarns, threads and ropes.

Figure 20:
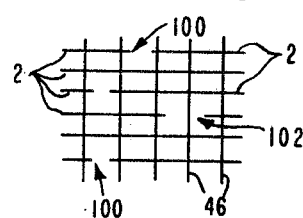
FIG. 20 shows schematically and in plan view a portion of a fabric containing optical filamentary material having ends terminating within the fabric.

A luminous effect which is different than that resulting from frustrated total reflection is obtained when the optical filamentary material terminates within the textile product since the illumination is concentrated at the ends of the material, providing point-source or "sparkle" illumination. FIG. 20 shows a fabric incorporating this embodiment of illumination, with the fabric being a 1:1 plain weave of optical filamentary material 2 and textile yarn 46. The material 2, however, instead of passing continuously through the fabric, terminates within the fabric, leaving spaced ends 100 and 102 of optical filamentary material, the ends 100 representing those on the left hand side of the space between the ends and the ends 102 representing the opposite side.

When light from a remote source (not shown) is applied such as shown in FIG. 19, but with the light traveling from left right, only the ends 100 are luminous. For the reverse direction of light travel, only ends 102 are luminous. For dual direction of light travel, such as obtained in FIG. 18, the ends 100 and 102 both glow. If the optical filamentary material 2 were modified to have frustrated total reflection preceding its glowing end 100 or 102, a combination of area illumination and point-source illumination results. These principles also apply for other textile products such as hereinbefore described.

Several examples of textile products of the present invention are described as follows:

EXAMPLE 1

(a) A 1:1 plain woven fabric is woven using the optical filamentary material (sheath-core filament) described in Examples III (components) and V (dimensions) of British Patent No. 1,037,498 and polyethylene terephthalate yarn having a denier of 80 and having a count of 33 threads/strand. This fabric is cut into 3 inch wide strips parallel to the optical filamentary material and 24 inches long. The optical filamentary material only at each end of the fabric is gathered into a bundle and cemented into an epoxy cement and surrounded with a metal ferrule. One such strip of fabric is illuminated with a bright light source, and the fabric does not glow.

(b) A second strip of the fabric is lightly sandblasted along about 16 inches of its length and then illuminated from both ends as above. About 2 inches of the fabric closest to the ferrules glow, thus indicating that all of the light is being dissipated in the glowing first 2 inches.

(c) A third strip is given a much less severe sandblasting treatment along about the same length as in paragraph (b), and when illuminated from the ends, the entire sandblasted length of the fabric glows. This test indicates that light sandblasting can be employed as a way of removing the sheath to produce a fabric that will glow. This experiment is repeated using a stencil of the letter A, and upon sandblasting and illumination, this letter appears as the illuminated area of the fabric.

(d) A fourth strip is abraded lightly along 16 inches of its length using 600 grit paper and when illuminated from both ends, the entire 16 in. length of the fabric glows. Similar results are obtained when crocus cloth is used in place of 600 grit paper.

(e) Paragraph 1(c) is repeated except that the yarn is replaced by the same optical filamentary material forming the other direction of the weave. Upon sandblasting and illumination, similar illumination results are obtained.

(f) Paragraph 1(c) is repeated except that the optical filamentary material is part of a polyester yarn (1:3). Upon sandblasting and illumination similar results are obtained. The yarn by itself is luminous and when twisted together with other like strands of yarn, the resultant thread is luminous.

EXAMPLE 2

A 3 inch wide by 24 inches long strip of fabric prepared as in Example 1(a) above is placed in "Freon" F–113 ($CCl_2FCClF_2$) solvent, at room temperature and agitated with ultrasonic agitation. The fabric is removed from the bath after three hours and allowed to dry. When this strip is tested by illuminating from each end, the fabric glows, resulting from the refraction producing effect of and light scattering by the yarn at the crossovers, whereat sheathing has been removed, with the optical filamentary material.

EXAMPLE 3

A sample of the fabric prepared as in Example 1(a) above is wiped along a portion of its length with a cloth saturated with "Freon" F–113 solvent. When this strip of fabric is illuminated from both ends of the bundle, it glows but not as uniformly as in Example 2, thus indicating that the fluoropolymer sheath has not been removed as uniformly as in Example 2.

EXAMPLE 4

A strip of fabric is prepared as in Example 1(a). It is then ironed along a portion of its length with a conventional electrically heated iron at a temperature suitable for ironing polyester fiber. This treatment presses the polyester yarn through the sheath of fluorocarbon resin and produces contact with the core of the optical filamentary material. When this strip is illuminated with a bright light from both ends, the strip glows uniformly along the hot ironed portion.

EXAMPLE 5

A sample of fabric is woven from polyester yarn and unsheathed optical filamentary material of Example 1(a). When this sample of fabric is illuminated from both ends, it glows uniformly similar to Example 2.

EXAMPLE 6

Example 1(c) is repeated using the sheath-core filament (polystyrene core and polymethylmethacrylate sheath) described in Example II of British Patent No. 1,037,498 as the optical filamentary material. Soaking of a portion of the fabric in acetic acid dissolves the sheath. Illumination results similar to Example 2 are obtained. When another strip of the same fabric is hot ironed, illumination results similar to Example 4 are obtained.

EXAMPLE 7

A 1:1 plain woven fabric is made by weaving 0.003 inch diameter glass filament with polyethylene yarn. Illumination of the ends of the glass filaments produces a uniformly luminous fabric.

As many apparently widely different embodiments of this invention may be made without departing from the spirit and scope thereof, it is to be understood that this invention is not limited to the specific embodiments thereof except as defined in the appended claims.

What is claimed is:

1. A textile product containing as an integral part thereof optical filamentary material, with at least a selected portion of said optical filamentary material being characterized by frustrated total reflection so as to render said product luminous thereat upon exposure of said optical filamentary material to a source of light at a point remote to said selected portion.

2. The textile product of claim 1 in combination with said source of light.
3. The textile product of claim 1 in the form of a fabric.
4. The textile product of claim 1 in the form of a yarn.
5. The textile product of claim 1 in the form of a thread.
6. The textile product of claim 1 in the form of a rope.
7. The textile product of claim 1 containing yarn interlaced with said optical filamentary material to produce a fabric.
8. The textile product of claim 7 wherein said yarn is a refraction producing material and is in contact with the light transmitting portion of said optical filamentary material.
9. The textile product of claim 7 wherein said optical filamentary material is in the form of single filaments.
10. The textile fabric of claim 1 wherein said optical filamentary material is composed of light transmitting core and a sheath, except at least in said selected portion.
11. The textile fabric of claim 10 wherein said core is plastic.
12. A process for illuminating a textile product comprising integrating optical filamentary material into said textile product, frustrating the total reflection of at least a selected portion of said optical filamentary material, and exposing a remote portion of said optical filamentary material to light, whereby illumination of said textile product in the area of said selected portion occurs.

References Cited

UNITED STATES PATENTS

| 2,372,868 | 4/1945 | Warren | 57—146 |
| 2,382,355 | 8/1945 | Warren | 57—140 X |
| 2,687,673 | 8/1954 | Boone. | |
| 3,247,756 | 4/1966 | Siegmund. | |

FOREIGN PATENTS 1,037,498  7/1966  Great Britain.

OTHER REFERENCES

A.C.M.I. (American Cystoscope Makers, Inc.), May 1960.

Industrial Electronics, vol. 4, No. 10, October 1966, pp. 470–471.

Mechanix Illustrated, vol. 62, No. 461, October 1966, pp. 92, 93, 152.

Nature, vol. 173, No. 4392, January 1954, pp. 39–41.

JAMES KEE CHI, Primary Examiner

U.S. Cl. X.R.

57—140; 65—1; 88—1; 161—175; 350—96